July 20, 1965     O. M. STUETZER     3,196,324
PRESSURE SENSITIVE RESISTOR DEVICE RESPONSIVE TO
PRESSURE CHANGES CAUSED BY AN IONIZING CURRENT
Filed Feb. 16, 1962
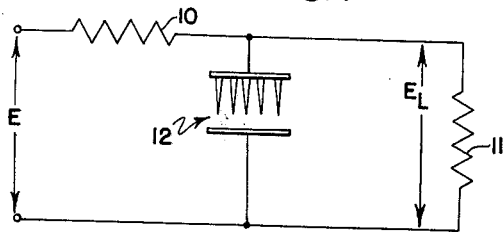
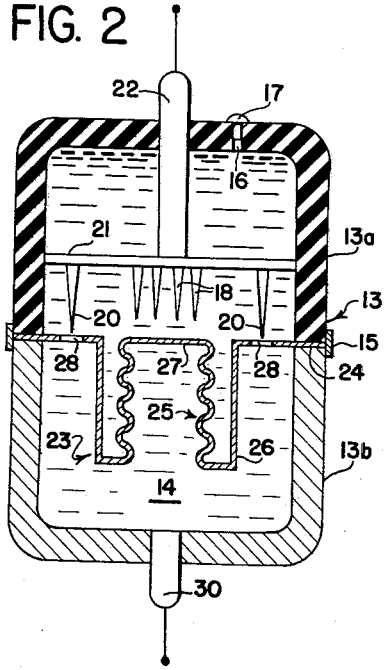
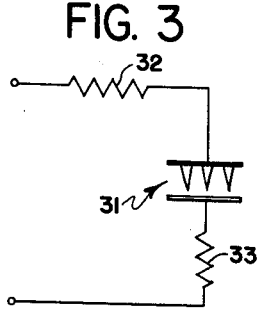
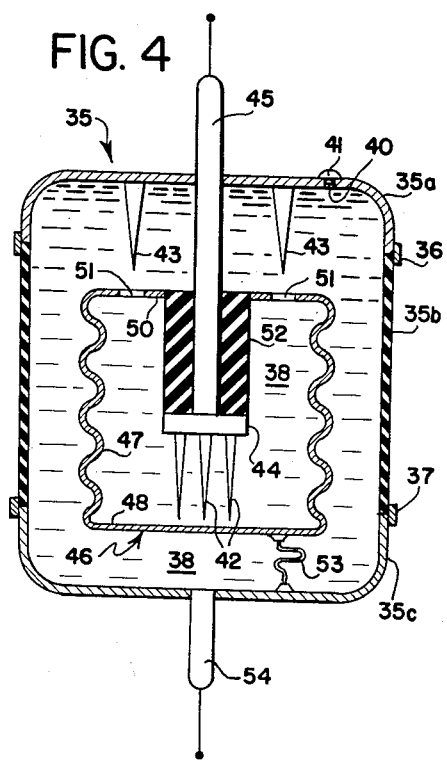
INVENTOR.
OTMAR M. STUETZER
BY
*Allen M. Sutton*
ATTORNEY

United States Patent Office 3,196,324
Patented July 20, 1965

3,196,324
PRESSURE SENSITIVE RESISTOR DEVICE RESPONSIVE TO PRESSURE CHANGES CAUSED BY AN IONIZING CURRENT
Otmar M. Stuetzer, Hopkins, Minn., assignor, by mesne assignments, to Litton Systems, Inc., Beverly Hills, Calif., a corporation of Maryland
Filed Feb. 16, 1962, Ser. No. 173,780
10 Claims. (Cl. 317—230)

This invention relates to electrical regulating devices and, more particularly, to devices for regulating relatively high direct voltages and/or relatively low direct currents.

Many electrical regulators that are commonly used today provide regulation through the use of vacuum tubes or other semiconductive devices that have limited lives and require periodic maintenance and replacement of parts. In addition, such devices generally draw a significant amount of power from the circuit being regulated and may well be damaged or made inoperable as a result of electrical surges or transients.

Accordingly, it is a primary object of the present invention to obviate the foregoing disadvantages by providing electrical regulating devices that are reliable, require no maintenance, and have virtually unlimited life.

It is another object to provide electrical regulating devices which draw negligible power from the circuit, when voltage is being regulated, and are not damaged by electrical surges or transients.

It is further object of the invention to provide such devices which are characterized by simplicity of design, ruggedness, small size, and low cost of construction.

In its broader aspects, the invention utilizes the principles of ion drag pressure generation to provide electrical regulation. Current flow between secondary ionizing electrode means and collector electrode means in an insulating liquid causes a pressure increase in the liquid. The pressure increase is utilized to change the spacing between a movable portion of the collector electrode means and primary ionizing electrode means to vary the current flow therebetween.

When the invention is embodied in a voltage-regulating device, an increase in pressure in the liquid, resulting from an increase in applied voltage, decreases the spacing between the aforementioned electrode means to decrease the resistance and increase the flow of current through the device. When the invention is embodied in a current-regulating device, an increase in pressure, resulting from an increase in the current to be regulated, causes an increase in the spacing between the electrode means to increase the resistance and decrease the flow of current through the device.

Further objects and advantages, as well as a better understanding of the invention, will be obtained from the following description, taken in conjunction with the accompanying drawing, in which:

FIG. 1 is a schematic diagram of a typical voltage-regulating circuit in which the invention might be utilized;

FIG. 2 is a diagrammatic sectional view of a voltage-regulating device embodying the invention;

FIG. 3 is a schematic diagram of a typical current-regulating circuit in which the invention might be utilized; and FIG. 4 is a schematic sectional view of a current-regulating device embodying the invention.

The fundamental theory of ion drag pressure generation is that, when ions in a partly ionized medium move under the influence of an electric field, friction with the carrier medium transfers momentum to the latter. The pressures created by this mechanism can be appreciable if ions of only one sign are present. A complete theoretical discussion of the ion drag pressure phenomena is contained in a paper by Otmar M. Stuetzer entitled "Ion Drag Pressure Generation" published in the Journal of Applied Physics, volume 30, No. 7, pages 984–994, July 1959. Therefore, the theoretical treatment of the phenomenon will not be discussed further herein.

It is sufficient for a complete understanding of the present invention to be aware that when ionizing electrode means and collector electrode means are spaced apart in an insulating or poorly conducting liquid and a voltage is applied between the electrode means, the liquid tends to move from the ionizing electrode means to the collector electrode means. Thus, if the flow of the liquid is restricted, pressure is built up within the liquid. The present invention utilizes that generated pressure to control the current flow from another set of ionizing electrode means to the collector electrode means and thus provide regulating action.

FIG. 1 illustrates schematically a typical circuit in which a voltage-regulating device constructed in accordance with the teachings of the invention might be utilized. A voltage-dropping resistor 10 and a load resistor 11 are connected in series across a source of direct electrical potential E, and a regulating device 12 is connected in parallel with the load resistor 11. Although the load is represented by the resistor 11, it might be any other electrical load across which the voltage is to be controlled.

In operation, if the voltage E tends to increase, thus increasing the voltage drop $E_L$, across the load resistor 11, current flow through the regulating device 12 increases. This causes an increase in the current flow and voltage drop across the dropping resistor 10 which reduces the voltage $E_L$ across the load resistor 11 to maintain it at substantially a constant value. Conversely, if the voltage E decreases, current flow through the regulating device 12 decreases to decrease the current flow and voltage drop across the resistor 10, and maintain the voltage $E_L$ across the load resistor 11 substantially constant.

FIG. 2 illustrates diagrammatically an embodiment of the invention suitable for incorporation as the voltage-regulating device 12 in the circuit shown in FIG. 1. As illustrated, the regulating device is contained within a cylindrical housing 13 which provides a container for a non-conductive or poorly conductive liquid 14 that substantially fills the container. The container 13 may be conveniently made in two parts, an upper part 13a being constructed of an insulating material, and a lower part 13b being constructed of a conductive material or having a conductive coating on its inner surface. The upper and lower parts 13a and 13b may be joined together by a strap 15 or by any other suitable conventional means. A filler opening 16 may be provided on the top surface of the upper portion 13a of the housing in order to introduce the liquid 14 after the device has been assembled, and a plug 17 may be used to seal the opening 16.

The liquid 14 was previously referred to as non-conductive or poorly conductive. As used herein, the term "nonconductive" is used to describe those liquids which are either truly insulating or poorly conductive. Examples of such liquids are castor oil, mineral oil, kerosene and paraffin oil. The invention, however, is in no way limited to the use of any particular nonconductive liquid.

Regulating action is provided by current flow through the liquid 14 from primary and secondary ionizing electrode means to collector electrode means. The primary ionizing electrode means comprises a plurality of corona discharge points 18 and the secondary ionizing electrode means comprises a plurality of corona discharge points 20. Both the primary and secondary corona discharge points 18 and 20 are secured to a conductive plate or disc 21 which, in turn, is electrically connected to and supported from a heavy conductor 22 extending through the upper end of the housing 13. The primary corona discharge points 18, which extend downwardly from the supporting plate 21, may conveniently be arranged in a circular array near the center of the supporting plate. The corona discharge points 20, which comprise the secondary ionizing electrode means, also extend downwardly from the supporting plate 21 and may be arranged in a circle near the periphery of the supporting plate concentric with the primary array and the conductor 22. For purposes of clarity, only a limited number of corona discharge points 18 and 20 have been illustrated, but it is to be understood that the number and arrangement of such points may be varied for different applications.

The collector electrode means in the voltage-regulating device shown in FIG. 2 is designated generally by the numeral 23. It comprises a disc-like member 24 and a generally cylindrical bellows arrangement 25 secured to the member 24 by a cylindrical wall 26, with the entire arrangement being substantially coaxial with the cylindrical container 13. The bellows arrangement 25 is open at its lower end and is provided with a solid or impervious upper end wall 27, which is spaced from the lower end of the corona discharge points 18 and is movable towards and away from them by expansion and contraction of the bellows arrangement 25.

The collector electrode 23 may be mounted by the disc-like member 24 being clamped between the upper and lower parts 13a and 13b of the housing. The disc-like member 24 is provided with a plurality of circular openings 28 arranged with one below each corona point 20. Electrical connection to the collector electrode 23, which is, of course, made of a conductive material, may be through the conductive lower part 13b of the container, which has a conductor 30 electrically connected to its lower surface.

It is pointed out that the invention is not limited to the use of a bellows arrangement for varying the spacing between the end wall 27 of the collector electrode and the primary corona discharge points 18. Other arrangements which include expansible means to accomplish substantially the same function may be used. For example, the bellows arrangement might be replaced by a simple conductive diaphragm which is responsive to pressure to vary its spacing from the corona points 18. Other pressure-sensitive, expansible arrangements might be substituted by one skilled in the art.

In operation, the voltage-regulating device shown in FIG. 2 may be connected in the manner shown for the regulating device 12 in FIG. 1; that is, the voltage to be regulated ($E_L$) is connected between the conductors 22 and 30 of the device. When a relatively high direct potential is supplied between the corona points 20 of the secondary ionizing electrode means and the collector electrode means, which are connected to the conductors 22 and 30, respectively, the nonconductive liquid 14 adjacent the corona points 20 is partially ionized and tends to move toward the disc-like member 24 and through the apertures 28. However, because the liquid 14 is confined within the container 13, pressure is built up in the liquid below the disc-like member 24 and within the bellows arrangement 25 of the collector electrode. As previously mentioned, this action is described both theoretically and experimentally in the aforementioned publication and will not be further explained here.

When pressure is created in the liquid 14 within the bellows arrangement 25, it causes the bellows to expand to bring the end wall 27 closer to the primary ionizing electrode means comprising the corona points 18. The corona points 18, which are also electrically connected to the conductor 22, partly ionize the nonconductive liquid 14 in their vicinity and current flows from the corona discharge points 18 to the end wall 27 of the collector electrode. It might be thought that the corona discharge points 18 also pump the liquid and thus tend to push the end wall 27 of the collector electrode away.

However, this is not the case. Although there is a pumping action, the momentum transfer from the pumped liquid to the collector electrode is, in first order approximation, just balanced by the strong attractive electrostatic field forces existing between the corona discharge points 18 and the end member 27 of the collector electrode.

For a constant potential difference applied between the conductors 22 and 30, an equilibrium point is reached at which the spacing between the corona discharge points 18 and the end wall 27 remains constant, the resistance of the regulating device is constant, and constant current flows through the device. If now the potential difference between the conductors 22 and 30 is increased, increased current flows between the secondary corona discharge points 20 and the collector electrode 23, which increases the pressure within the bellows arrangement 25. This tends to move the end wall 27 closer to the primary corona discharge points 18 and decrease the resistance and increase the current flow therebetween. Thus, if the device is connected in a circuit such as that shown in FIG. 1, increased current flows through the dropping resistor 10 and through the regulating device 12 to increase the voltage drop across the resistor 10 and maintain the voltage across the load substantially constant. In practice it may be advantageous to enclose resistor 10 within the housing 13.

Conversely, if the potential difference across the regulating device is decreased, the current flowing between the secondary corona discharge points 20 and the collector electrode 23 tends to decrease. This causes a decrease in pressure within the bellows arrangement 25 which causes the end wall 27 to move farther away from the primary corona discharge points 18. The resistance to current flow through the device is increased, thus reducing the current flow through the dropping resistor 10 and the voltage drop across the resistor to increase the voltage across the load (FIG. 1).

The electrical regulating device of the invention may also be adapted for operation as a current-regulting device for use in a circuit such as that shown in FIG. 3. In such an application, a current-regulating device 31 is generally connected in series with a current-limiting resistor 32 and the electrical load through which current is to be regulated, shown here as a simple resistor 33. If the current flowing through the circuit tends to increase, the resistance of the regulating device 31 increases to maintain the current flow at a constant level. It is pointed out that this is opposed to the action of a voltage-regulating device (FIG. 1), where the resistance of the regulating device 12 decreases as the voltage across the circuit increases.

FIG. 4 illustrates an embodiment of the invention adapted for use as a current-regulating device in a circuit such as that shown in FIG. 3. The current-regulating device comprises a cylindrical closed container, shown generally by the numeral 35, which includes a top cover member 35a, a cylindrical center portion 35b, and a bottom cover member 35c. The top and bottom members 35a and 35c are made of a conductive material, while the cylindrical center portion 35b is made of an insulating material. The three sections of the container 35 may be secured together by straps 36 and 37 or by any other suitable conventional means. If desired, the cover members 35a, 35c, may be made of insulating material and provided with conductive layers on their inside surfaces.

The container 35 is filled with a nonconductive liquid 38 of the type previously described with reference to the device shown in FIG. 2. The liquid may be introduced into the container through a filler hole 40 which may then be closed by a suitable plug 41.

As in the embodiment of the invention previously described, regulating action is provided by current flow through the nonconductive liquid from primary and secondary ionizing electrode means to collector electrode means. The primary ionizing electrode means comprises a plurality of corona discharge points 42, and the secondary ionizing electrode means comprises a plurality of corona discharge points 43. The primary corona discharge points 42 extend downwardly from a conductive disc 44 to which they are secured. The disc 44, in turn, is electrically and mechanically connected to the lower end of a heavy conductor 45 which extends upwardly and out through the top cover 35a of the housing 35. The conductor 45 is also electrically connected to and is mechanically supported from the conductive top cover 35a of the housing.

The secondary corona discharge points 43 also extend downwardly from the top cover 35a of the housing to which they are electrically and mechanically connected. Thus, it is seen that the conductor 45 is electrically connected to both the primary and secondary corona discharge points 42 and 43, respectively.

The primary corona discharge points 42 may be conveniently arranged in a circular array on the conductive disc 44, and the secondary corona discharge points 43 may be arranged in a circular array concentric with the conductor 45. Although only three primary corona discharge points 42 and two secondary corona discharge points 43 are shown, it is understood that the number and arrangement of such discharge points may be varied to fit the particular application.

The collector electrode means is designated generally by the numeral 46 and comprises a bellows arrangement 47 provided with a closed lower end wall 48 and an upper end wall 50 having apertures 51 therein. The collector electrode 46 is supported by means of its top wall 50 from a block of insulating material 52 carried by the heavy conductor 45 so that the collector electrode 46 is insulated from the conductor 45. The apertures 51 in the top wall 50 are arranged directly below the secondary corona discharge points 43; the collector electrode 46, which is made of a conductive material, may be electrically connected to the conductive bottom cover 35c of the container by means of an electrical lead 53. External electrical connection to the conductive bottom cover 35c of the container 35 is provided by a conductor 54 secured to its bottom surface.

The current-regulating device shown in FIG. 4 operates in much the same manner as the voltage-regulating device shown in FIG. 2. However, because the primary ionizing electrode means is located inside the bellows arrangement in the current-regulating device, an increase in current flow between the secondary ionizing electrode means and the collector electrode means tends to increase the spacing between the primary ionizing electrode means and the collector means, rather than decrease it, as in the voltage-regulating device previously described. When the current-regulating device shown in FIG. 4 is connected in series in an operating circuit, pressure within the nonconductive liquid 38 resulting from current flow between the secondary corona discharge points 43 and the collector electrode 46 causes the bellows arrangement 47 to expand until the lower end wall 48 is based from the primary corona discharge points 42 in a position of equilibrium. Thereafter, any increase in current flowing in the circuit will increase the pressure within the liquid and cause the bellows arrangement 47 to expand farther. This increases the spacing between the primary corona discharge points 42 and the end wall 48 of the collector electrode, thus increasing the resistance of the device and decreasing the current flowing therethrough. Conversely, any decrease in the current flowing through the device decreases the current flowing between the secondary corona discharge points 43 and the collector electrode 46, thus decreasing the pressure within the bellows arrangement 47, which results in decreasing the spacing between the primary corona discharge points 42 and the end wall 48, decreasing the resistance of the device, and increasing the current flow therethrough.

As in the case previously described, there is some pumping action between the primary corona discharge points 42 and the end wall 48 of the collector electrode. However, because there are no openings in the end wall 48 below the corona discharge points, as there are in the top wall below the secondary corona discharge points 43, the pumping action is just balanced by the strong attractive electrostatic field forces existing between the primary corona discharge points 42 and the end wall 48 of the collector electrode.

The current-regulating device of the invention is not limited to the use of the particular bellows arrangement illustrated, and other expansible means performing substantially the same function may be substituted therefor by one skilled in the art.

The regulating devices of the invention find their principal applications in the regulation of relatively high direct potentials and/or relatively low direct currents. This occurs because the internal resistance of the devices is quite high—generally of the order of $10^7$ ohms. This is an advantage when regulating voltage because very little power will be drawn from the circuit. However, it is a disadvantage when regulating current, because current flow through the regulating device is limited to the order of a few microamperes by the device itself. Of course, a plurality of regulating devices may be used in parallel.

The various parameters of the regulating devices herein described must generally be determined for each application individually. However, certain guides have been determined. For example, the spacing between the ionizing corona points and the collector electrode depends on the voltage being handled, with the general rule being that the spacing should be about one millimeter per 10,000 volts across the device. Each discharge point permits current flow of approximately two microamperes, depending on the ion mobility in the nonconductive liquid being used. It has been found in practice that a single arrangement can regulate voltages from a few thousand volts up to 10,000 volts.

It is now apparent that electrical regulating devices constructed in accordance with the invention fulfill the objectives set forth above. Of course, many changes and modifications may be made to the embodiments illustrated and described by one skilled in the art without departing from the true spirit and scope of the invention.

What is claimed is:

1. An electrical regulating device comprising a container, nonconductive liquid in said container, primary and secondary ionizing electrode means in said liquid electrically connected together, collector electrode means in said liquid spaced apart from said primary and secondary ionizing electrode means, said collector electrode means including a movable portion spaced from said primary ionizing electrode means, said portion being movable in response to pressure resulting from current flow between said secondary ionizing electrode means and said collector electrode means to vary the spacing between said primary ionizing electrode means and said movable portion, and electrical connections to said ionizing electrode means and to said collector electrode means for connection to an electrical circiut to be regulated.

2. The device defined by claim 1, wherein said primary and secondary ionizing electrode means comprise corona discharge means.

3. The device defined by claim 1, wherein said collector electrode means comprises bellows arranged for pressure therein to vary the spacing between an end wall of the bellows and said primary ionizing electrode means.

4. The device defined by claim 3, wherein pressure within said bellows decreases the spacing between said end wall and said primary ionizing means.

5. The device defined by claim 3, wherein pressure within said bellows increases the spacing between said end wall and said primary ionizing means.

6. An electrical regulating device comprising a closed container, nonconductive liquid filling said container, primary ionizing electrode means in said liquid, collector electrode means in said liquid comprising expansible means having a movable portion thereof spaced from said primary ionizing electrode means for current flow therebetween, secondary ionizing electrode means in said liquid outside said expansible means and spaced from said collector electrode means for current flow therebetween, said movable portion being responsive to liquid pressure within said expansible means resulting from current flow between said secondary ionizing electrode means and said collector electrode means to vary the spacing between said movable portion and said primary ionizing electrode means, an electrical connection to said primary and secondary ionizing electrode means, and an electrical connection to said collector electrode means.

7. The device defined by claim 6, wherein said primary and secondary ionizing electrode means comprise corona discharge means.

8. The device defined by claim 6, wherein increased liquid pressure within said expansible means decreases the spacing between said movable portion and said primary corona discharge means.

9. The device defined by claim 6, wherein increased liquid pressure within said expansible means increases the spacing between said movable portion and said primary corona discharge means.

10. An electrical regulating device comprising a container, a substantially nonconductive liquid in said container, first and second ionizing electrode means in said liquid electrically connected together, each of said first and second ionizing electrode means including a plurality of corona discharge points, collector electrode means in said liquid generally separating said liquid into two sections, said collector electrode means including a movable imperforate portion spaced from the discharge points of said first ionizing electrode means and a fixed portion spaced from the discharge points of said second ionizing electrode means having apertures therein aligned with the discharge points belonging to said second ionizing electrode means, whereby said movable portion is movable in response to pressure resulting from current flow between the discharge points of said second ionizing electrode means and said fixed portion, said apertures permitting said pressure to be transmitted to said movable portion, to vary the spacing between said first ionizing electrode means and said movable portion, and electrical connections to said ionizing electrode means and to said collector electrode means for connection to an electrical circuit to be regulated.

References Cited by the Examiner

UNITED STATES PATENTS

| | | | |
|---|---|---|---|
| 1,300,127 | 4/19 | Creighton | 317—61.5 |
| 2,359,955 | 10/44 | Whitenack | 323—28 |

LLOYD McCOLLUM, *Primary Examiner.*

ROBERT L. SIMS, *Examiner.*